(12) United States Patent
Snyder et al.

(10) Patent No.: US 11,170,140 B2
(45) Date of Patent: Nov. 9, 2021

(54) AIRCRAFT COMPONENT QUALIFICATION SYSTEM AND PROCESS INCLUDING VARIATION MODELING

(71) Applicant: United Technologies Corporation, Farmington, CT (US)

(72) Inventors: Daniel A. Snyder, Manchester, CT (US); Kurt R. Heinemann, East Hampton, CT (US); Glenn Levasseur, Colchester, CT (US)

(73) Assignee: Raytheon Technologies Corporation, Farmington, CT (US)

(*) Notice: Subject to any disclaimer, the term of this patent is extended or adjusted under 35 U.S.C. 154(b) by 577 days.

(21) Appl. No.: 16/026,627

(22) Filed: Jul. 3, 2018

(65) Prior Publication Data
US 2020/0012751 A1 Jan. 9, 2020

(51) Int. Cl.
*G06F 30/20* (2020.01)
*G06F 111/10* (2020.01)
*G06N 20/00* (2019.01)

(52) U.S. Cl.
CPC .......... *G06F 30/20* (2020.01); *F05D 2260/81* (2013.01); *F05D 2260/821* (2013.01);
(Continued)

(58) Field of Classification Search
CPC ..... G06F 30/20; G06F 2111/10; G06N 20/00; F05D 2260/81; F05D 2200/00;
(Continued)

(56) References Cited

U.S. PATENT DOCUMENTS 6,802,045 B1 10/2004 Sonderman et al.
6,969,821 B2 11/2005 Mika et al.
(Continued)

FOREIGN PATENT DOCUMENTS

| CN | 106917641 A | 7/2017 |
| GB | 2536628 A | 9/2016 |
| RU | 2016115404 A | 10/2017 |

OTHER PUBLICATIONS

Lu et al. "Modeling Multiresponse Surfaces for Airfoil Design with Multiple-Output-Gaussian-Process Regression". May 2014Journal of Aircraft 51(3)740-747 DOI: 10.2514/1.C032465. (Year: 2014).*
(Continued)

*Primary Examiner* — Eunhee Kim
(74) *Attorney, Agent, or Firm* — Carlson, Gaskey & Olds, P.C.

(57) ABSTRACT

A method for qualifying a gas turbine engine component includes creating a first set of substantially identical gas turbine engine components via a uniform manufacturing procedure, determining a set of as-manufactured parameters of each gas turbine engine component in the first set, and determining a variance model of the first set. The variance model includes a representative parameter profile, which includes a plurality of component parameter profiles. The sum of each of the component parameter profiles is the representative parameter profile. The method also includes determining at least one predicted response models based at least in part on the variance model, identifying as-manufactured parameters of a second engine component, applying the as-manufactured parameters of the second engine component to the at least one predicted response models, thereby generating a predicted response output, and qualifying the second engine component for usage in at least one gas
(Continued)

turbine engine corresponding to the at least one predicted response model.

21 Claims, 6 Drawing Sheets

(52) U.S. Cl.
CPC ...... *F05D 2260/83* (2013.01); *G06F 2111/10* (2020.01); *G06N 20/00* (2019.01)

(58) Field of Classification Search
CPC ........... F05D 2220/323; F05D 2260/83; F05D 2260/821; F05D 2260/00; F05D 2270/71
See application file for complete search history.

(56) References Cited

U.S. PATENT DOCUMENTS

| | | | |
|---|---|---|---|
| 7,926,289 | B2 | 4/2011 | Lee et al. |
| 8,712,739 | B2 | 4/2014 | Jiang et al. |
| 9,816,897 | B2 | 11/2017 | Ziarno |
| 9,818,242 | B2 | 11/2017 | Volponi et al. |
| 2004/0117152 | A1* | 6/2004 | Shafer .................. G06Q 10/06 702/183 |
| 2004/0262277 | A1* | 12/2004 | Mika .................... F01D 21/003 219/121.85 |
| 2008/0015725 | A1* | 1/2008 | Eichblatt .......... G05B 19/41875 700/109 |
| 2014/0208768 | A1 | 7/2014 | Bacic |
| 2014/0358500 | A1* | 12/2014 | Morris ................... G06F 30/23 703/2 |
| 2017/0132777 | A1 | 5/2017 | Durrant et al. |
| 2019/0146470 | A1* | 5/2019 | Akkaram ........... G05B 23/0254 700/30 |

OTHER PUBLICATIONS

Brown, Jeffrey M. and Ramana V. Grandhi, Reduced-Order Model Development for Airfoil Forced Response, International Journal of Rotating Machinery, Jul. 9, 2007, pp. 1-12, vol. 2008, Article ID 387828, Hindawi Publishing Corporation.
U.S. Appl. No. 15/956,884, filed Apr. 19, 2018.
The European Search Report for EP Application No. 19184003.2, dated Dec. 10, 2019.

\* cited by examiner

AIRCRAFT COMPONENT QUALIFICATION SYSTEM AND PROCESS INCLUDING VARIATION MODELING

TECHNICAL FIELD

The present disclosure relates generally to a process for qualifying manufactured gas turbine engine components, and more specifically to a qualification process including a representative variance model.

BACKGROUND

Gas turbine engines, such as those utilized in commercial and military aircraft, include a compressor section that compresses air, a combustor section in which the compressed air is mixed with a fuel and ignited, and a turbine section across which the resultant combustion products are expanded. The expansion of the combustion products drives the turbine section to rotate. As the turbine section is connected to the compressor section via one or more shaft, the rotation of the turbine section further drives the compressor section to rotate. In some examples, a fan is also connected to the shaft and is driven to rotate via rotation of the turbine as well.

Any given gas turbine engine is constructed of a significant number of individually manufactured components. Among the individually manufactured components can be blades, vanes, panels, outer air seals, and the like. In some cases, such as with a compressor rotor or a fan, multiple substantially identical components can be utilized in a single engine assembly. During manufacture of such components it is possible for one or more parameter of the component to be out of specification, resulting in a sub-optimal or an unusable component.

SUMMARY OF THE INVENTION

An exemplary method for qualifying a gas turbine engine component includes creating a first set of substantially identical gas turbine engine components via a uniform manufacturing procedure, determining a set of as-manufactured parameters of each gas turbine engine component in the first set of substantially identical gas turbine engine components, determining a variance model of the first set of substantially identical gas turbine engine components, wherein the variance model includes a representative parameter profile, the representative parameter profile is comprised of a plurality of component parameter profiles, and the sum of each of the component parameter profiles is the representative parameter profile, determining at least one predicted response models based at least in part on the variance model, identifying as-manufactured parameters of a second engine component, and applying the as-manufactured parameters of the second engine component to the at least one predicted response models, thereby generating a predicted response output, and qualifying the second engine component for usage in at least one gas turbine engine corresponding to the at least one predicted response model.

In another example of the above described method for qualifying a gas turbine engine component the representative parameter profile is one of a mean average, a median average, and a mode average parameter profile of the first set of substantially identical gas turbine engine components.

In another example of any of the above described methods for qualifying a gas turbine engine component the representative parameter profile is one of a mean average, a median average, and a mode average of each component in the first set of substantially identical gas turbine engine components that falls within one standard deviation of a mean average of all components in the first set of substantially identical gas turbine engine components.

In another example of any of the above described methods for qualifying a gas turbine engine component the plurality of component parameter profiles include at least one of a lean component, a twist component, a vibratory component, and a bend component.

Another example of any of the above described methods for qualifying a gas turbine engine component further includes installing the second engine component in an engine in response to the component being qualified.

In another example of any of the above described methods for qualifying a gas turbine engine component the second engine component is an engine component in the first set of substantially identical gas turbine engine components.

In another example of any of the above described methods for qualifying a gas turbine engine component the second engine component is substantially identical to each gas turbine engine component in the first set of substantially identical gas turbine engine components.

In another example of any of the above described methods for qualifying a gas turbine engine component the second engine component is manufactured via the uniform manufacturing procedure.

In another example of any of the above described methods for qualifying a gas turbine engine component each component in the first set of substantially identical gas turbine engine components includes an airfoil.

In another example of any of the above described methods for qualifying a gas turbine engine component the at least one predicted response model includes a Gaussian process model.

In one exemplary embodiment a system for qualifying a gas turbine engine component includes a computer system configured to receive a set of as-manufactured parameters of a first set of substantially identical gas turbine engine components and determine a variance model and at least one predicted response model, each of the variance model and the predicted response model being based at least in part on the as-manufactured parameters of the first set of substantially identical gas turbine engine components, wherein the variance model includes a representative parameter profile, the representative parameter profile is comprised of a plurality of component parameter profiles, and the sum of each of the component parameter profiles is the representative parameter profile, the computer system being further configured to receive a second set of as-measured parameters of a second gas turbine engine component, apply the second set of parameters to the predicted response model, and generate a predicted response of the second gas turbine engine component corresponding to each of the predicted response models, and qualify the second gas turbine engine component when the predicted response is within a predefined range.

In another example of the above described system for qualifying a gas turbine engine component the second gas turbine engine component is an engine component in the first set of substantially identical gas turbine engine components.

In another example of any of the above described systems for qualifying a gas turbine engine component the second gas turbine engine component is substantially identical to each gas turbine engine component in the first set of substantially identical gas turbine engine components.

In another example of any of the above described systems for qualifying a gas turbine engine component the set of substantially identical gas turbine engine components are manufactured using a uniform manufacturing technique.

In another example of any of the above described systems for qualifying a gas turbine engine component the second gas turbine engine component is manufactured via the uniform manufacturing procedure.

In another example of any of the above described systems for qualifying a gas turbine engine component the representative parameter profile is one of a mean average, a median average, and a mode average parameter profile of the first set of substantially identical gas turbine engine components.

In another example of any of the above described systems for qualifying a gas turbine engine component the representative parameter profile is one of a mean average, a median average, and a mode average of each component in the first set of substantially identical gas turbine engine components that falls within one standard deviation of a mean average of all components in the first set of substantially identical gas turbine engine components.

In another example of any of the above described systems for qualifying a gas turbine engine component the plurality of component parameter profiles include at least one of a lean component, a twist component, a vibratory component, and a bend component.

In another example of any of the above described systems for qualifying a gas turbine engine component a qualification status of the second gas turbine engine component is transmitted to a manufacturing system configured to at least partially install the second gas turbine engine component in a gas turbine engine in response to the second gas turbine engine component being qualified.

These and other features of the present invention can be best understood from the following specification and drawings, the following of which is a brief description.

DETAILED DESCRIPTION OF AN EMBODIMENT

Figure 1:
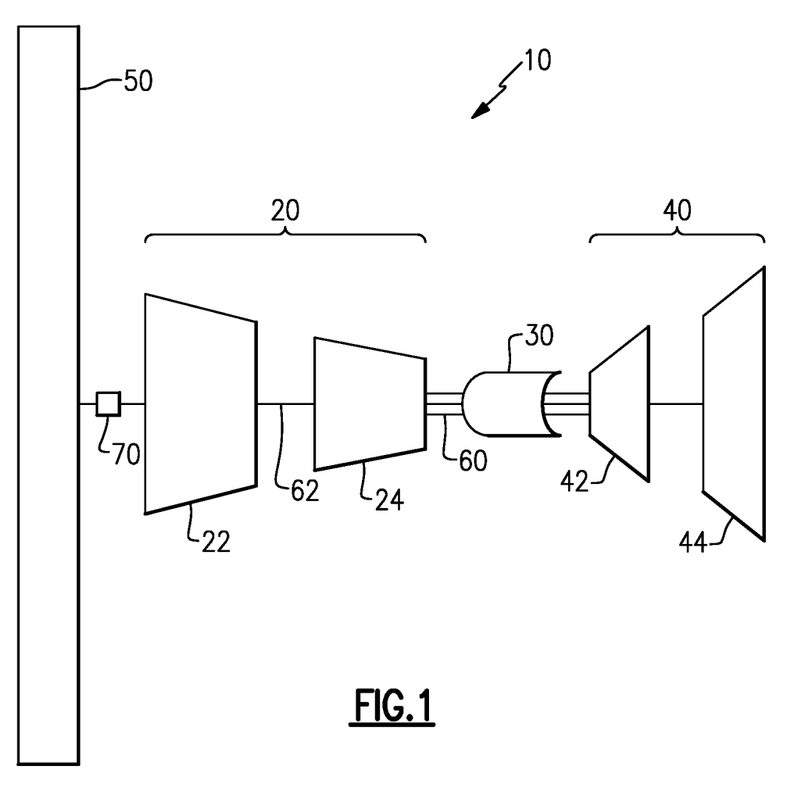
FIG. 1 illustrates a high level schematic view of an exemplary gas turbine engine.

FIG. 1 schematically illustrates a gas turbine engine 10 including a compressor section 20, a combustor section 30, and a turbine section 40. Positioned fore of the compressor section 20 is a fan 50. The compressor section 20 includes a low pressure compressor 22 and a high pressure compressor 24. Similarly, the turbine section 40 includes a high pressure turbine 42 and a low pressure turbine 44. The high pressure turbine 42 is connected to the high pressure compressor 24 via a first shaft 60 and rotation of the high pressure turbine 42 drives rotation of the high pressure compressor 24. Similarly, the low pressure compressor 22 is connected to the low pressure turbine 44 via a second shaft 62 and the rotation of the low pressure turbine 44 drives rotation of the low pressure compressor 22. In the example engine 10 of FIG. 1, the fan 50 is connected to, and driven by, the first shaft 62 via a gear system 70.

One of skill in the art will appreciate that in alternative examples, an alternative number of turbines 42, 44 and compressors 22, 24 can be utilized and still achieve similar results. Similarly, the fan 50 can be driven via a direct connection to the shaft 62 instead of the geared system 70, or driven in any other known manner.

Each of the fan 50, the compressors 22, 24 and the turbines 42, 44 are constructed from multiple substantially identical components which can include rotor blades, vanes, blade outer air seals, and the like. Each component is constructed according to a set of multiple design parameters. Each of those design parameters is given a range of acceptable values to account for manufacturing variations, as well as tolerances with the engine structure.

Existing component qualification systems determine the as-manufactured dimensions of each manufactured component, compare the measured dimensions of the manufactured component to the design dimensions, including tolerances, and determine that the component is "acceptable" when every parameter falls within the as designed specification. The type of manufacturing process used to make the part, and the relationship between each measured parameter and each other measured parameter is not included within the existing analysis. In some examples, such as those where the manufacture of each component is particularly expensive, unqualified components are manually reviewed to determine if the component may still be acceptable for use within an engine despite including one or more parameter that is outside of the as designed tolerances. In alternative examples, the unqualified component can be scrapped or reworked to meet tolerances.

Figure 2A:
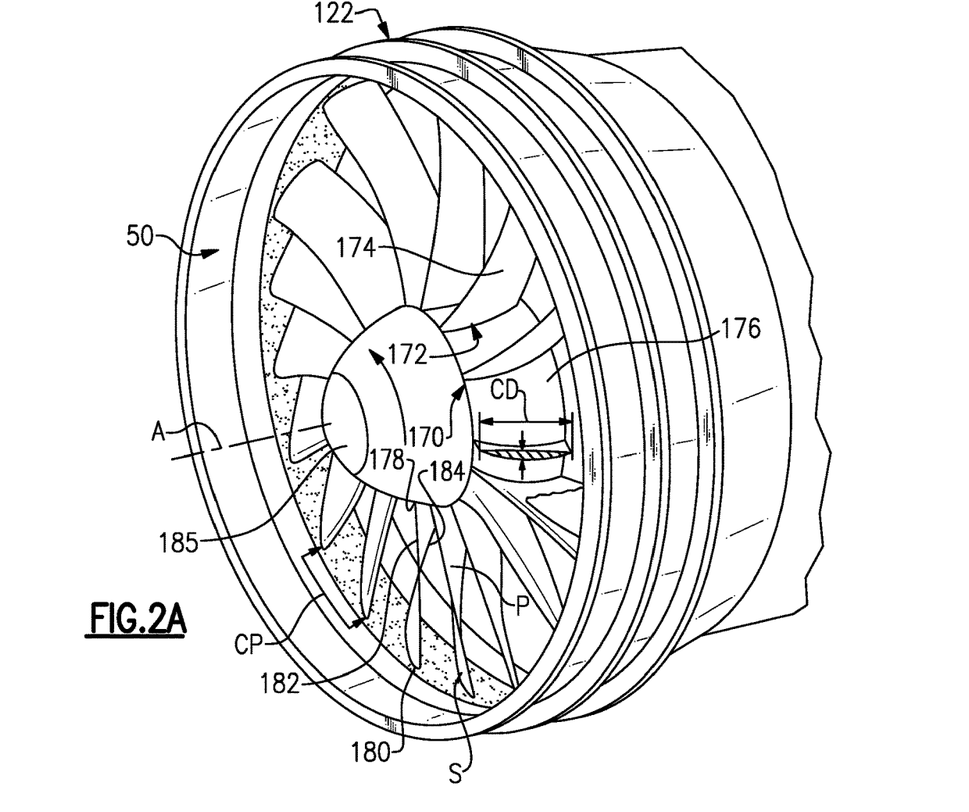
FIG. 2A is a perspective view of a fan section of the engine of FIG. 1.
Figure 2B:
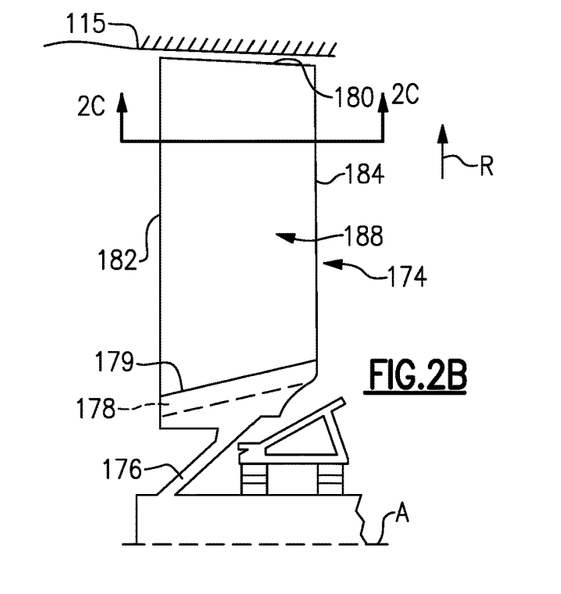
FIG. 2B is a schematic cross-sectional view of the fan section of FIG. 2A.
Figure 2C:
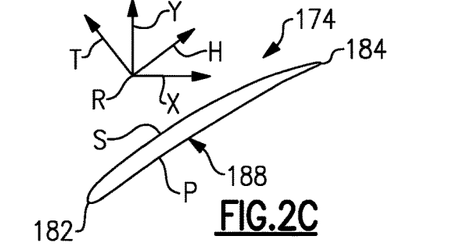
FIG. 2C is a schematic view of a cross-section of an airfoil of FIG. 2B sectioned at a particular span position and depicting directional indicators.

One such structure in the example of FIG. 1 is the fan 50. Referring to FIGS. 2A-2C, the fan 50 includes a rotor 170 having an array or row 172 of airfoils or blades 174 that extend circumferentially around, and are supported by, the fan hub 176. Any suitable number of fan blades 174 may be used in a given application. The hub 176 is rotatable about the engine axis A. The array 172 of fan blades 174 are positioned about the axis A in a circumferential or tangential direction Y. Each of the blades 174 includes an airfoil body that extends in a radial span direction R from the hub 176 between a root 178 and a tip 180, in a chord direction H (axially and circumferentially) between a leading edge 182 and a trailing edge 184 and in a thickness direction T between a pressure side P and a suction side S.

Each blade 174 has an exterior surface 188 providing a contour that extends from the leading edge 182 aftward in a chord-wise direction H to the trailing edge 184. The exterior surface 188 of the fan blade 174 generates lift based upon its geometry and directs flow along the core flow path and bypass flow path. The fan blade 174 may be constructed from a composite material, or an aluminum alloy or titanium alloy, or a combination of one or more of these. Abrasion-resistant coatings or other protective coatings may be applied to the fan blade 174.

A chord, represented by chord dimension (CD), is a straight line that extends between the leading edge 182 and the trailing edge 184 of the blade 174. The chord dimension (CD) may vary along the span of the blade 174. The row 172 of blades 174 also defines a circumferential pitch (CP) that is equivalent to the arc distance between the leading edges 182 or trailing edges 184 of neighboring blades 174 for a corresponding span position. The root 178 is received in a correspondingly shaped slot in the hub 176. The blade 174 extends radially outward of a platform 179, which provides the inner flow path. The platform 179 may be integral with the blade 174 or separately secured to the hub 176, for example. A spinner 185 is supported relative to the hub 176 to provide an aerodynamic inner flow path into the fan section 122.

Figure 3A:
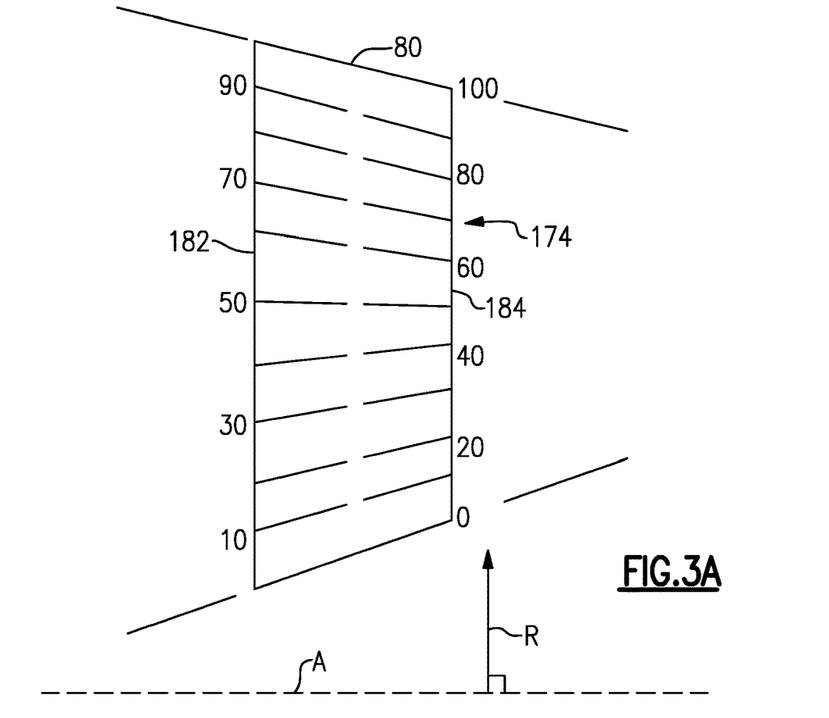
FIG. 3A is a schematic view of airfoil span positions.
Figure 3B:
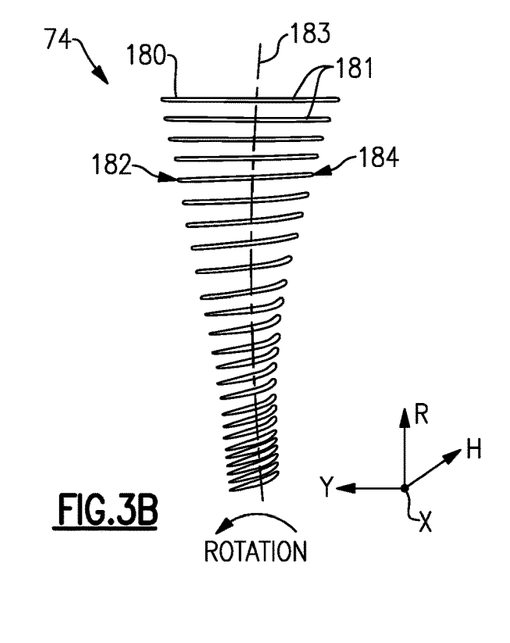
FIG. 3B is a perspective view of sections of the airfoil of FIG. 2A at various span positions.

Referring to FIGS. 3A-3B, span positions are schematically illustrated from 0% to 100% in 10% increments to define a plurality of sections 181. Each section at a given span position is provided by a conical cut that corresponds to the shape of segments the bypass flow path or the core flow path, as shown by the large dashed lines (shown in FIG. 3A). In the case of a fan blade 174 with an integral platform, the 0% span position corresponds to the radially innermost location where the airfoil meets the fillet joining the airfoil to the platform 179. In the case of a fan blade 174 without an integral platform, the 0% span position corresponds to the radially innermost location where the discrete platform 179 meets the exterior surface of the airfoil (shown in FIG. 2B). A 100% span position corresponds to a section of the blade 174 at the tip 80.

In some examples, each of the blades 174 defines a non-linear stacking axis 183 (shown in FIG. 3B) in the radial direction R between the tip 180 and the inner flow path location or platform 179. For the purposes of this disclosure, "stacking axis" refers to a line connecting the centers of gravity of airfoil sections 181. In some examples, each fan blade 174 is specifically twisted about a spanwise axis in the radial direction R with a corresponding stagger angle at each span position and is defined with specific sweep and/or dihedral angles along the airfoil 174. Airfoil geometric shapes, stacking offsets, chord profiles, stagger angles, sweep and dihedral angles, and surface shape in an X, Y, Z coordinate system, among other associated features, can be incorporated individually or collectively to improve characteristics such as aerodynamic efficiency, structural integrity, and vibration mitigation, for example.

Figure 3C:
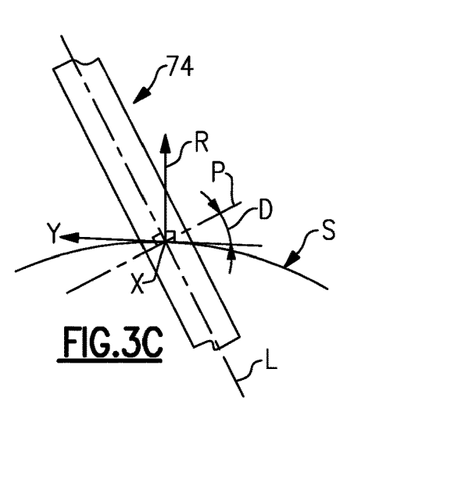
FIG. 3C is a schematic representation of a dihedral angle for an airfoil.

In some examples, the airfoil 174 defines an aerodynamic dihedral angle D (simply referred to as "dihedral") as schematically illustrated in FIG. 3C. An axisymmetric stream surface S passes through the airfoil 174 at a location that corresponds to a span location (FIG. 3A). For the sake of simplicity, the dihedral D relates to the angle at which a line L along the leading or trailing edge tilts with respect to the stream surface S. A plane P is normal to the line L and forms an angle with the tangential direction Y, providing the dihedral D. A positive dihedral D corresponds to the line tilting toward the suction side (suction side-leaning), and a negative dihedral D corresponds to the line tilting toward the pressure side (pressure side-leaning).

As can be seen, each individual fan blade 174 defines multiple parameters such as chord dimension, radial span length, thickness, contour, circumferential pitch, stacking axis, stagger angle, sweep angle, and dihedral angle. Further, many of the example parameters as well as additional parameters can be required to meet tolerances at each of multiple span positions resulting in a substantial number of parameters, any one of which can disqualify the fan blade 174 if it is out of tolerance range under existing manufacturing processes. While described above with regards to the fan 50, and individual fan blades 174, it should be understood that similar parameters exist for any given blade and/or vane utilized through the engine 10, including those within the compressor section 20, and the turbine section 40. Further, any number of other engine components can have similar numbers of parameters, all of which must be within tolerance, even if the parameters of the given component are not the same as the airfoil parameters described above.

Under current manufacturing processes, if any of the above described parameters, or any similar parameters that may be necessary for a given component, are out of tolerance at any single point the component will fail inspection (be disqualified) and either scrapped or provided to an engineering team for manual review. Further it should be understood that the above described parameters are merely exemplary parameters of a fan blade 174, and practical components can include more and different parameters that are subjected to the same level of analysis when qualifying the component.

With reference to each of FIGS. 1-3C, disclosed herein is an improved system and process for qualifying manufactured parts based on the totality of the part configuration, rather than individually based on each parameter at each location on the component. In some examples, one or more parameter may be out of tolerance, but when the component is considered as a whole it will still be an acceptable configuration. Further exacerbating this is the fact that different manufacturing techniques for any given component (e.g. additive manufacturing vs. casting) can result in different acceptable configurations that may include one or more parameter outside of the as designed tolerances.

With continued reference to FIGS. 1-3C, FIG. 4 schematically illustrates an exemplary system 300 for developing and analyzing a batch of manufactured parts in order to qualify individual parts. Initially a batch of parts are manufactured using a single manufacturing process or uniform combination of processes in a manufacture parts step 310. Once a full batch of the parts has been manufactured, each parameter of each of the parts is measured in an inspect parts step 320. The output of the inspect parts step 320 is a data set that includes a measurement of each parameter of each part in the manufacturing run. The as-manufactured data set is then provided to a computer system and is used by the computer system to train a part analysis in a "train analysis system" step 330 within the train analysis step 330. The computer system develops a variance model that models the variations of an average, or exemplary part, for the specific manufacturing process or processes based on the set of measured as-manufactured parts. Contemporaneously with the variance model, the computer system develops a predictive model, that can predict the behavioral characteristics, such as efficiency, bending, vibration, etc. of a given component based on the specific parameters of that component and the engine in which the component is to be included.

Figure 4:
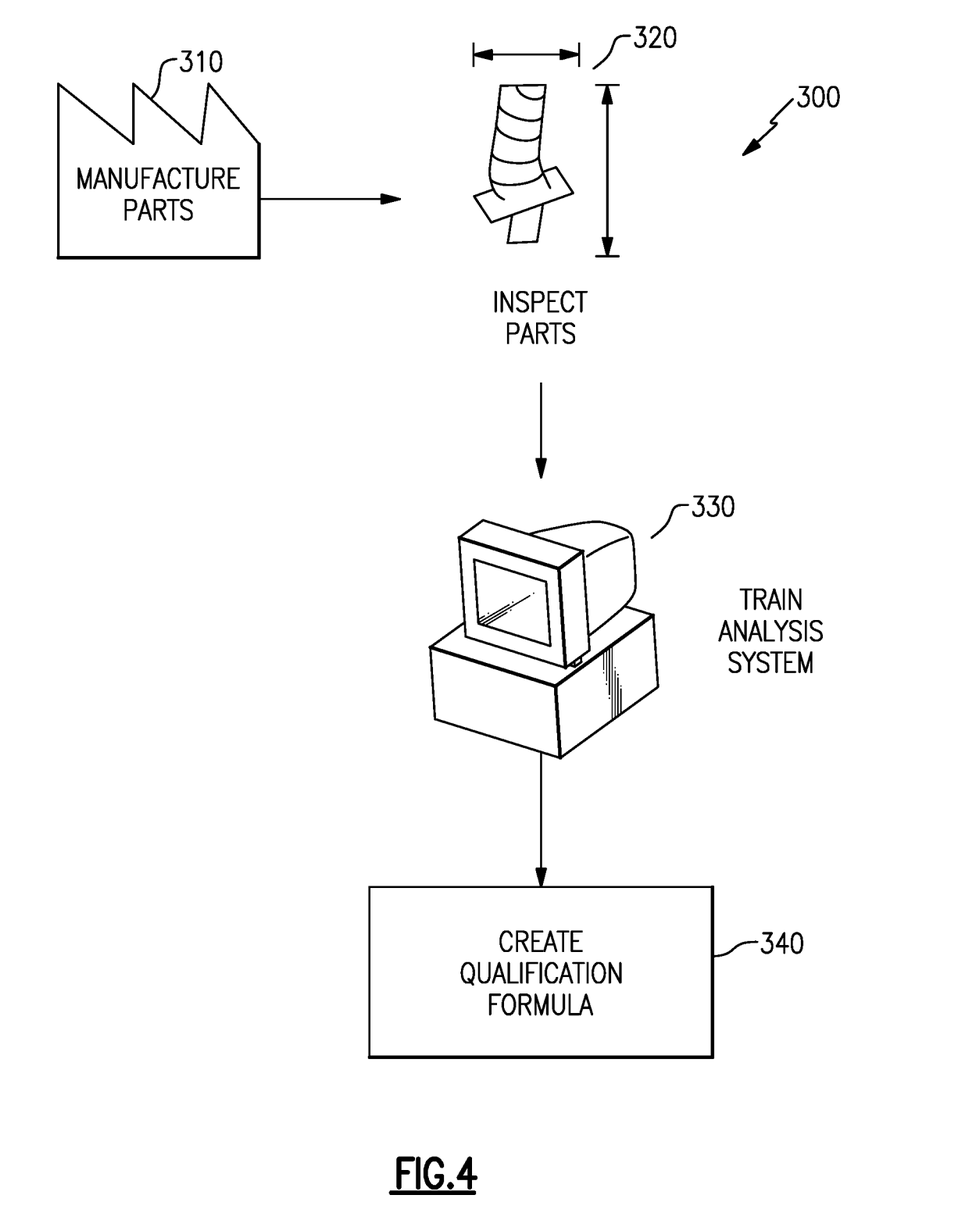
FIG. 4 schematically illustrates an exemplary system for developing and analyzing a batch of manufactured parts in order to qualify individual parts.

The variation model is a dimension reducing model, and describes a large number of observable variables' values using a smaller number of independent, latent variables. A latent variable is a variable whose value depends on our understanding of the latent structure inside the observed data. The latent structure of the data can only be determined from correlation analysis of the observed variables, and the correlation analysis requires observations of multiple as-manufactured parts. The usage of the as-manufactured measurements of the batch of components to create the variance model and the predictive model can be referred to as a principal component analysis (PCA). In some examples, the predictive model is a Gaussian Process (GP) model.

Based on the predictive model, and the variance model, the computer system then creates a qualification formula in a "create qualification formula" step 340. The qualification formula is a function, or set of functions, that define an acceptable component based on all of its parameters instead of being based on each parameter's individual tolerances. Due to the number of parameters (in some cases the number of parameters can exceed 20), and the number of positions on the part where each parameter is to be measured, the functions determined by the computer system are high order functions, and determining whether an individual component meets the functions would be prohibitively time consuming if performed manually.

With continued reference to FIG. 4, and the train analysis step 330 specifically, one aspect of the step is the creation of the variance model. The variance model is a representative model that models the as-manufactured variations of a component made using a single manufacturing technique. By modeling the as-manufactured variations, the actual variations of the component can be correlated with corresponding predicted results allowing for a more accurate qualification than qualification systems using the as-designed tolerances can account for. By way of example, an as-designed tolerance of +/−5 inches does not account for a manufacturing process that may skew on the plus side of the tolerance 80% of the time, and on the minus side of the tolerance 20% of the time. Further, the as-designed system cannot account for the impact of an as-manufactured variation on the acceptable tolerances of related parameters. As a result, as-designed tolerances utilize worst case scenarios to inform the allowable tolerance. FIGS. 5-9B illustrate the creation of a variance model, such as could be used in the train analysis step 330, and provided to the create qualification formula step 340 of FIG. 4.

With continued reference to FIGS. 1-4, FIG. 5 illustrates an exemplary blade 400, or other engine component, including five tolerance points 410, 420, 430, 440, 450. Each of the tolerance points 410, 420, 430, 440, 450 are spaced along the blade 400 in, for example, 20% span increments. The representation of only five evenly spaced points is made in the interest of simplified explanation. One of skill in the art will appreciate that an as-designed blade, or other component, will include substantially more, and more complex as-designed tolerances including dihedral angles, stacking lines, sweep, surface curvature, vibratory response, etc.

Figure 5:
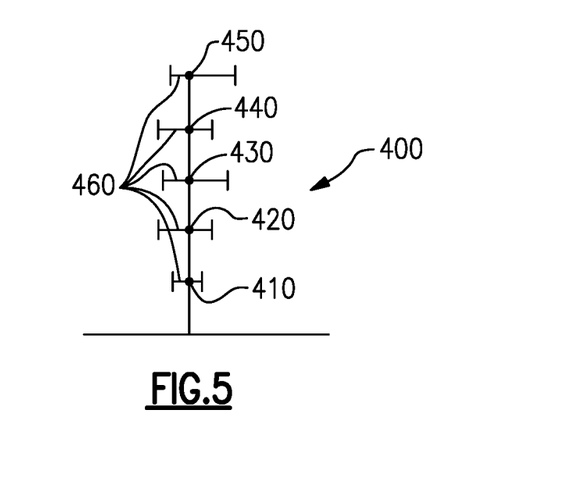
FIG. 5 schematically illustrates a simplified component as designed.

Each of the tolerance points 410, 420, 430, 440, 450 includes a corresponding tolerance range 460 that extends in a positive direction and a negative direction. The as-designed tolerance ranges represent a range of absolute positions where the corresponding tolerance point 410, 420, 430, 440, 450 of an actually manufactured blade 400 can be located and still result in an acceptable component without consideration for the absolute position of any other tolerance point 410, 420, 430, 440, 450 within its corresponding range. As used herein, "absolute position" refers to a position of any given point of the exemplary blade relative to a single static reference point.

Due to the tolerance ranges 460, each as-manufactured blade 400 will have a unique profile, and the variation of one tolerance point 410, 420, 430, 440, 450 affects the possible and acceptable tolerance ranges of each adjacent tolerance point 410, 420, 430, 440, 450. This affect can result in increased tolerances that allow a component to qualify while technically falling out of the worst case scenario as-designed tolerance ranges 460.

Figure 6:
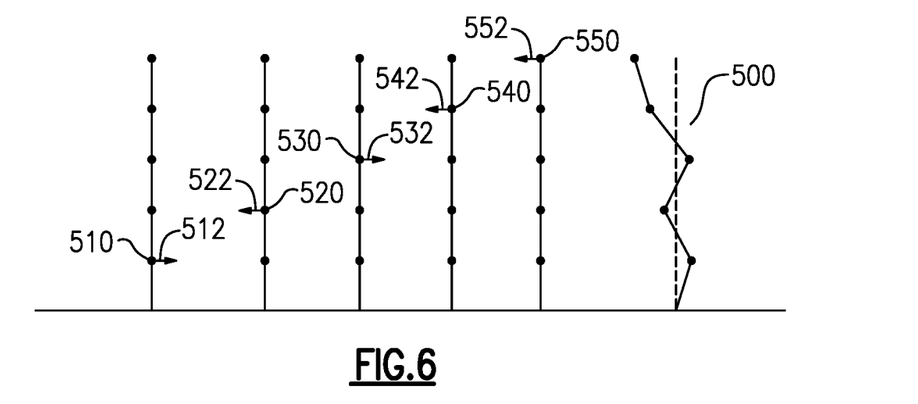
FIG. 6 schematically illustrates a single instance of an as-manufactured component according to the design specification described at FIG. 5.

With continued reference to FIG. 5, FIG. 6 illustrates an as-manufactured example blade 500, with an as-manufactured variation 512, 522, 532, 542, 552 at each tolerance point 510, 520, 530, 540, 550. As can be seen in the as manufactured blade 500, the variation of each tolerance point affects the absolute position of each adjacent tolerance point, even while the adjacent tolerance points may fall within the as-designed tolerance ranges 460. As a result, some absolute positions of the tolerance points 510, 520, 530, 540, 550, that may fall outside of the as-designed tolerance ranges 460 can still result in an overall blade 500 that meets qualification parameters. In order to determine a variance model that accounts for the impact adjacent tolerance points 510, 520, 530, 540, 550 have on related parameters, the train analysis step 330 utilizes the as-manufactured parameters (e.g. blade 500) of multiple blades within a single manufacturing run using a single manufacturing technique to define the variance model. The sample size required to determine an adequate number of samples depends on the type of manufacturing process used. By way of example, determining the variance model can in some instances utilize a sample size of at least 25 blades 400, 500 manufactured using an identical manufacturing process. In instances where a more accurate sampling is required, the variance model determination can require at sample size of at least 200 components.

Figure 7:
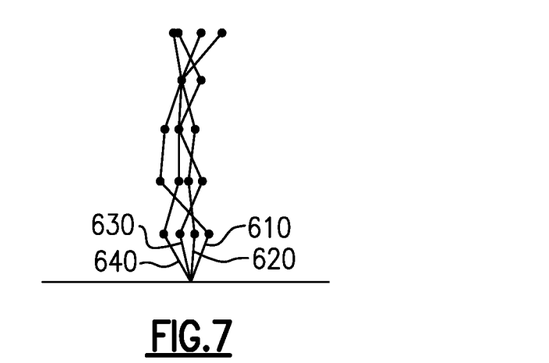
FIG. 7 schematically illustrates a set of as-manufactured components.
Figure 8:
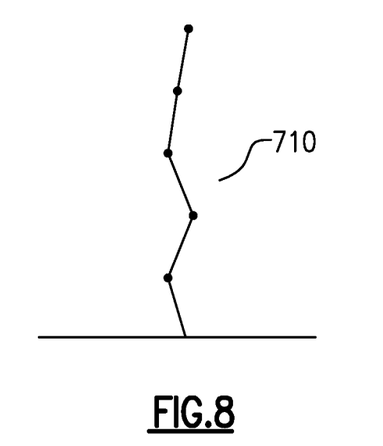
FIG. 8 schematically illustrates an average component representative of the set illustrated in FIG. 7.

Once the train analysis step 330 has received the as-manufactured profiles of multiple blades 500, the blades are overlaid, and an average, or representative blade profile is determined. With continued reference to FIGS. 1-6, FIG. 7 illustrates four exemplary blade profiles 610, 620, 630, 640 overlaid and FIG. 8 illustrates the average profile 710 of all of the exemplary blade profiles 610, 620, 630, 640. As described above, a practical implementation will include substantially more tolerance points, as well as substantially more as-manufactured blades in order to more fully develop a representative blade profile 710.

While illustrated as a mean average blade profile 710, it should be appreciated that alternative variance modeling systems can utilize a different method of creating the representative profile. By way of example, the representative profile can be determined as a mean average of each profile 610, 620, 630, 640 that falls within one standard deviation, a mode of the blade profiles 610, 620, 620, 640, or any other statistical representation of the combined blade profiles 610, 620, 630, 640.

Figure 9A:
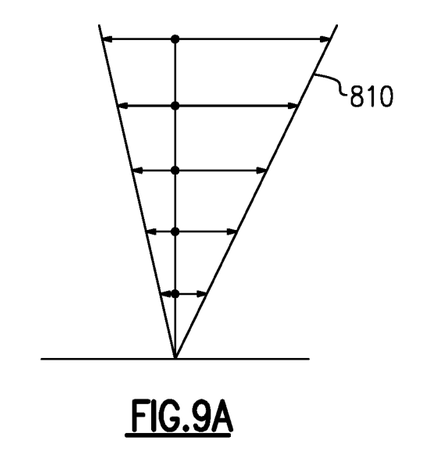
FIGS. 9A and 9B illustrate exemplary component patterns within the average component of FIG. 8.
Figure 9B:
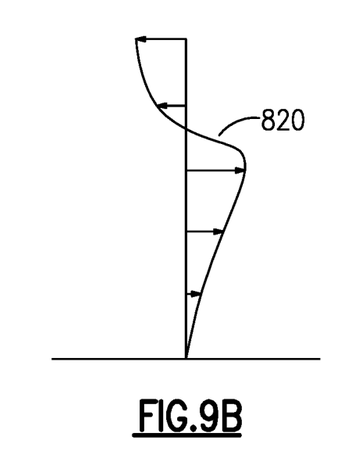

The representative blade profile 710 is further represented by multiple distinct component profiles. FIG. 9A schematically illustrates a lean component of the representative blade profile 710 and FIG. 9B schematically illustrates a bending component 820 of the representative blade profile 710. Additional parameters or features, such as twist etc. are also represented in a similar fashion. Each of the representations provides the as-manufactured variation of the given parameter 810, 820 and can be described as a vector. When each of the parameters 810, 820 are summed, the resultant vector provides the representative blade profile 710.

By isolating each component 810, 820, the variance model is able to determine and account for relationships between the components 810, 820 and each other, as well as the impact of particular variations on the result of the predictive model determined in the train analysis step 330 of FIG. 4.

By using the process described herein, the number of blades that can be qualified without requiring additional engineering analysis can be increased, thereby reducing the time and expenditure required to qualify parts, as well as further reducing waste or scrap parts by decreasing the number of components that are disqualified.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A method for qualifying a gas turbine engine airfoil comprising:
creating a first set of identical gas turbine engine airfoils via a uniform manufacturing procedure;
determining a set of as-manufactured parameters of each gas turbine engine airfoil in the first set of identical gas turbine engine airfoils;
determining a variance model of the first set of identical gas turbine engine airfoils, wherein the variance model includes a representative parameter profile, the representative parameter profile is comprised of a plurality of airfoil parameter profiles, and the sum of each of the airfoil parameter profiles is the representative parameter profile;
determining at least one predicted response models based on the variance model;
identifying as-manufactured parameters of a second engine airfoil, and applying the as-manufactured parameters of the second engine airfoil to the at least one predicted response models, thereby generating a predicted response output, wherein the predicted response output includes predicted behavioral characteristics of the second engine airfoil; and
qualifying the second engine airfoil for usage in at least one gas turbine engine corresponding to the at least one predicted response model.

2. The method of claim 1, wherein the representative parameter profile is one of a mean average, a median average, and a mode average parameter profile of the first set of identical gas turbine engine airfoils.

3. The method of claim 1, wherein the representative parameter profile is one of a mean average, a median average, and a mode average of each airfoil in the first set of identical gas turbine engine airfoils that falls within one standard deviation of a mean average of all airfoils in the first set of identical gas turbine engine airfoils.

4. The method of claim 1, wherein the plurality of airfoil parameter profiles include at least one of a lean airfoil, a twist airfoil, a vibratory airfoil, and a bend airfoil.

5. The method of claim 1, further comprising installing the second engine airfoil in an engine in response to the airfoil being qualified.

6. The method of claim 1 wherein the second engine airfoil is an engine airfoil in the first set of identical gas turbine engine airfoils.

7. The method of claim 1, wherein the second engine airfoil is identical to each gas turbine engine airfoil in the first set of identical gas turbine engine airfoils.

8. The method of claim 7, wherein the second engine airfoil is manufactured via the uniform manufacturing procedure.

9. The method of claim 1, wherein the at least one predicted response model includes a Gaussian process model.

10. The method of claim 1, where the predicted behavioral characteristics of the second engine airfoil include at least one of efficiency, bending and vibration.

11. The method of claim 10, wherein the predicted behavioral characteristics of the second engine airfoil include each of efficiency, bending and vibration.

12. The method of claim 1, wherein the predicted response model is a principle airfoil analysis (PCA) model configured to predict behavioral characteristics of a defined airfoil.

13. A system for qualifying a gas turbine engine airfoil comprising:
a computer system configured to receive a set of as-manufactured parameters of a first set of identical gas turbine engine airfoils and determine a variance model and at least one predicted response model, each of the variance model and the predicted response model being based on the as-manufactured parameters of the first set of identical gas turbine engine airfoils, wherein the variance model includes a representative parameter profile, the representative parameter profile is comprised of a plurality of airfoil parameter profiles, and the sum of each of the airfoil parameter profiles is the representative parameter profile;
the computer system being further configured to receive a second set of as-measured parameters of a second gas turbine engine airfoil, apply the second set of parameters to the predicted response model, and generate a predicted response of the second gas turbine engine airfoil corresponding to each of the predicted response models, wherein the predicted response of the second gas turbine engine airfoil includes predicted behavioral characteristics of the second engine airfoil; and
qualify the second gas turbine engine airfoil when the predicted response is within a predefined range.

14. The system of claim 13, wherein the second gas turbine engine airfoil is an engine airfoil in the first set of identical gas turbine engine airfoils.

15. The system of claim 13, wherein the second gas turbine engine airfoil is identical to each gas turbine engine airfoil in the first set of identical gas turbine engine airfoils.

16. The system of claim 13, wherein the set of identical gas turbine engine airfoils are manufactured using a uniform manufacturing technique.

17. The system of claim 16, wherein the second gas turbine engine airfoil is manufactured via the uniform manufacturing procedure.

18. The system of claim 13, wherein the representative parameter profile is one of a mean average, a median average, and a mode average parameter profile of the first set of identical gas turbine engine airfoils.

19. The system of claim 13, wherein the representative parameter profile is one of a mean average, a median average, and a mode average of each airfoil in the first set of identical gas turbine engine airfoils that falls within one standard deviation of a mean average of all airfoils in the first set of identical gas turbine engine airfoils.

20. The system of claim 13, wherein the plurality of airfoil parameter profiles include at least one of a lean airfoil, a twist airfoil, a vibratory airfoil, and a bend airfoil.

21. The method of claim 13, wherein the predicted response model is a principle airfoil analysis (PCA) model configured to predict behavioral characteristics of a defined airfoil.

\* \* \* \* \*